F. W. BULL.
PROPELLER BLADE MACHINE.
APPLICATION FILED JAN. 21, 1909.

963,858.

Patented July 12, 1910.

Witnesses:
Robert R. Cornell.
Robert H. Adams.

Inventor:
Frederick Wm Bull,

UNITED STATES PATENT OFFICE.

FREDERICK WILLIAM BULL, OF NORFOLK, VIRGINIA.

PROPELLER-BLADE MACHINE.

963,858.  Specification of Letters Patent.  Patented July 12, 1910.

Application filed January 21, 1909. Serial No. 473,557.

*To all whom it may concern:*

Be it known that I, FREDERICK WILLIAM BULL, a citizen of the United States of America, residing at Norfolk, county of Norfolk, State of Virginia, have invented certain new and useful Improvements in Propeller-Blade Machines, of which the following is a specification, reference being had therein to the accompanying drawings.

My invention relates to improvements in machines for forming curved surfaces for propellers, or wood or metal patterns for blades of same, and the objects of my improvements are to form the surfaces with extreme accuracy, and to so simplify the operation that no special skill is required, there being no gears or similar mechanism for obtaining the proper pitch ratios.

I attain these objects by the mechanism shown in the accompanying drawings, in which—

Figure 1:
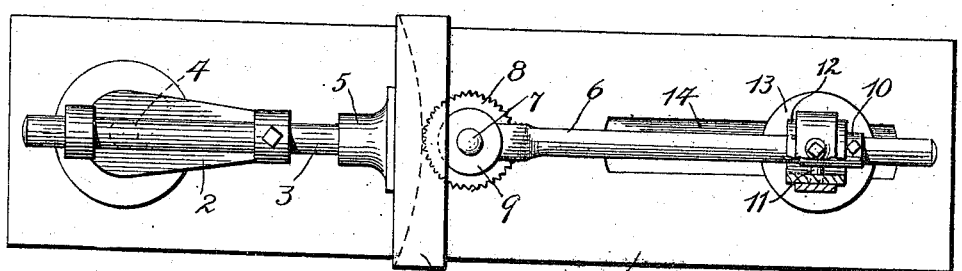
Figure 2:
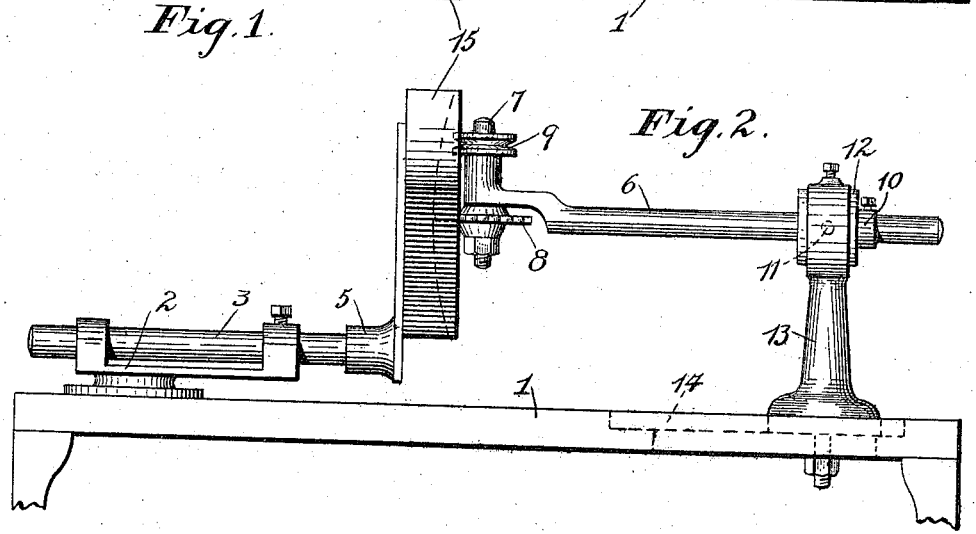
Figures 3, 4:
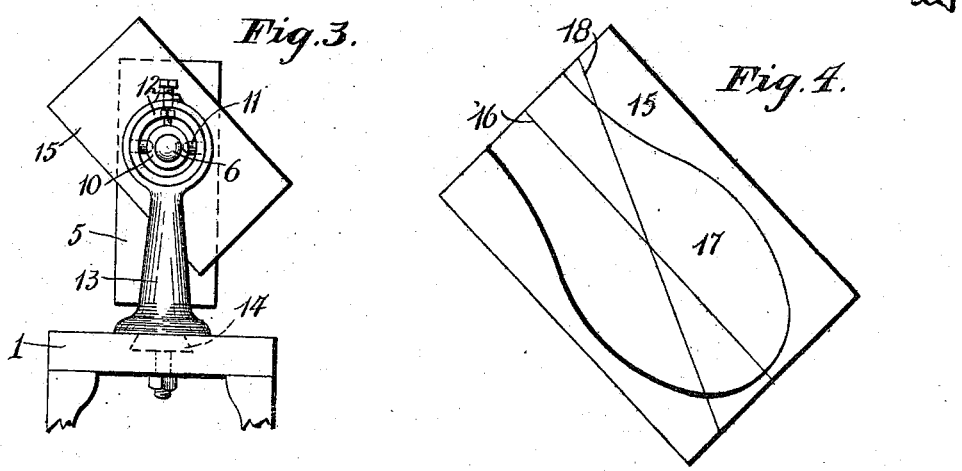

Figure 1 is a plan view. Fig. 2 is a side elevation. Fig. 3 is an end view. Fig. 4 is an enlarged plan of the blank, showing method of laying out pattern.

Similar numbers refer to similar parts all views.

1 is a bed or frame.
2 is a bearing carrying a shaft.
3 is a shaft supported in bearing 2.
4 is a center on which bearing 2 turns.
5 is a bracket supported on shaft 3.
6 is a shaft or radius bar, carrying a bearing for a saw mandrel, and is adjustable to any length radius.
7 is a saw mandrel.
8 is a saw or cutter.
9 is a pulley for belt drive.
10 is a bearing in which shaft 6 is movably mounted.
11 are pins or centers on which bearing 10 turns, permitting shaft and saw to move vertically.
12 is a ring supporting pins 11 and bearing 10, itself supported by stand 13, on which it may be partly rotated permitting shaft 6 to move in planes inclined to the vertical (*e. g.* line 18, Fig. 4).
13 is a stand movably mounted on bed plate 1.
14 is a slot, permitting adjustment of stand 13.
15 is a block or blank from which the pattern is to be formed.
16 is the longitudinal axis of pattern.
17 is a pattern (left hand) laid out on the blank.
18 is the line traversed by saw when ring 12 is rotated in stand 13.

The operation is as follows. A block of proper size is fastened to bracket 5. Shafts 3 and 6 are then adjusted to the lengths to give the pitch ratio desired (if the propeller be of a pitch ratio of 1, the shafts will be of equal length, and the line 16, Fig. 4, will lie at an angle of 45 degrees from the vertical) stand 13 being moved if necessary to bring saw to the proper position for the cut. The bracket carrying the blank being then moved to and fro and the saw raised and lowered vertically, the movements in combination, form the required curved surface, on which a pattern for the blade of a propeller can be laid out.

If blank 15 be of metal or other homogeneous material, either a right or left hand pattern can be laid out on the surface formed. But if the blank 15 is of wood, the grain of which must lie parallel with the axis of pattern, it may be placed on the bracket 5, either as shown or in any position required to bring the grain of the wood in proper position.

The above is the preferred method of operation. But shafts 3 and 6 may be clamped in position, and a moderate range of variation in the diameter and pitch of patterns, may be obtained by rotating ring 12, causing shaft 6 to move in some required plane other than vertical (*e. g.* 18 Fig. 4) without change in radius of shafts 3 and 6.

Having now described my invention, what I claim is:

1. In an apparatus of the nature described, the combination of a bed plate, a work holder, a shaft secured to the work holder, a bearing secured to said bed plate and forming an adjustable support for said shaft, of a stand adjustably secured to the bed plate, a bearing capable of universal adjustment supported on said stand, a radius bar adjustably supported in the said bearing and carrying a tool, and means for imparting rotary movement to said tool, as and for the purpose set forth.

2. In an apparatus of the nature described, the combination of a bed plate, a bearing adjustably secured to said bed plate, a work holder, a shaft secured to said work holder and adjustably supported in said bearing, of a stand adjustably secured on said bed plate in relation to said work holder, a ring bearing rotatably mounted on said stand, a tubular bearing pivotally supported in said ring bearing, a radius bar adjustably secured in said tubular bearing, a tool rotatably supported on said radius bar, and means for imparting rotary movement to said tool.

3. In an apparatus of the nature described, the combination with a bed plate, a pivotal bearing vertically mounted on said bed plate, a work holder, a shaft secured to said work holder and supported in said pivotal bearing to permit of horizontal and radial movement of said work holder, of a radius bar, a tool supported on said radius bar, a bearing for said radius bar pivotally mounted in a ring bearing permitting the radial movement of said radius bar and tool in a vertical plane of any desired radius, and means for supporting said radius bar and bearings on said bed plate, as and for the purpose described.

4. In an apparatus of the nature described, the combination with a bed plate, of a work holder secured to a shaft, said shaft supported in a pivot bearing to permit of radial movement of said work holder in relation to said bed plate, of a radius bar, a tool carried by said bar, a bearing supporting said radius bar and of such structure as to permit movement of the tool carried by said radius bar at any angle to the plane of movement of said work holder, and means for supporting said bearing on said bed plate.

FREDERICK WILLIAM BULL.

Witnesses:
J. W. FORBES,
JOHN T. COX.